United States Patent

[11] 3,619,485

[72] Inventors Donald John Cross
Tonawanda;
Robert Roy Eckenbrecht, East Bethany,
both of N.Y.
[21] Appl. No. 787,880
[22] Filed Dec. 30, 1968
[45] Patented Nov. 9, 1971
[73] Assignee G.T.E. Sylvania Incorporated

[54] TELEVISION AND SCANNED FILM COLOR IMAGE DISPLAY SYSTEM
4 Claims, 5 Drawing Figs.

[52] U.S. Cl. .......... 178/5.2 R, 178/5.4, 352/185, 226/113, 226/114
[51] Int. Cl. .......... H04n 9/02
[50] Field of Search .......... 178/5.2 A, 5.2, 5.40, 5.4 CR, 7.6, 5.2 D, 7.2 D, 6.7 A, 6.7; 352/166, 185; 226/113, 114

[56] References Cited

UNITED STATES PATENTS

| | | | |
|---|---|---|---|
| 2,898,397 | 8/1959 | Richman .......... | 178/5.2 |
| 2,318,118 | 5/1943 | Warner et al. .......... | 178/5.4 |
| 3,128,333 | 4/1964 | Loughlin .......... | 178/5.2 |
| 3,270,131 | 8/1966 | Pinter .......... | 178/6.8 |
| 3,459,885 | 8/1969 | Goldmark et al. .......... | 178/5.4 |

*Primary Examiner*—Robert L. Griffin
*Assistant Examiner*—Richard P. Lange
*Attorneys*—Norman J. O'Malley, Cyril A. Krenzer and Thomas H. Buffton

ABSTRACT: A system for providing a color image display derived from color television signals and photographic film includes a color image reproducer; first signal source means responsive to color television signal to provide signals representative of luminance, chrominance and synchronizing information; second signal source means responsive to light-scanned photographic film to provide signals representative of luminance and chrominance information; transport means for effecting conveyance of a film through said second signal source means and synchronization of said film conveyance and said first signal source means; and switching means for selective coupling of signals representative of luminance and chrominance information from said first and second signal source means to said color image reproducer.

INVENTOR.
DONALD J. CROSS &
ROBERT R. ECKENBRECHT
BY
Cyril A. Kunzer
ATTORNEY

INVENTOR.
DONALD J. CROSS &
ROBERT R. ECKENBRECHT
BY
Cyril A. Krenzer
ATTORNEY

TELEVISION AND SCANNED FILM COLOR IMAGE DISPLAY SYSTEM

CROSS-REFERENCE TO OTHER APPLICATIONS

Copending application Ser. No. 657,623 now Pat. No. 3,553,352, filed Aug. 1, 1967, entitled "COLOR REPRODUCTION SYSTEM" relates to apparatus for selectively applying signals from a first and second signal source to a color image reproducer to effect a color image display derived from received signals and film. Also, copending application, Ser. No. 758,908 now Pat. No. 3,548,081 entitled "-VISUAL DISPLAY SYSTEM" filed Sept. 10, 1968 and assigned to the Assignee of the present application relates to apparatus which includes an image reproducer, first and second signal sources, and a switching means and adapter for selective direct coupling of signals from the first and second signal source to the reproducer.

BACKGROUND OF THE INVENTION

Generally, color image display systems are best known in the form of a color television camera and transmitter in conjunction with a color television receiver. In the usual manner, the color television camera employs an image storage device such as a vidicon to provide color television signals derived from a viewed scene or from photographic films. In turn, the color television signals are transmitted, intercepted, and processed by a color television receiver to provide a color image display.

Unfortunately, apparatus necessary to the above-mentioned color image display systems is of the so-called "commercial" rather than "consumer" type. Obviously, "commercial" type apparatus is not readily available to a consumer, is usually relatively expensive and complex, and is neither operable, available or particularly applicable to the provision of a color image display by an untrained viewer. Thus, it is highly unlikely that an average consumer, desirous of providing a color image display from film, such as a home movie film, would invest in the apparatus available and the training necessary to provide such a display.

Other known forms of color image display systems include a flying spot scanner system wherein a flying spot scanner tube in conjunction with photographic film and a projector are employed to provide a color image display. Therein, film conveyed by the projector is light-scanned by the flying spot scanner tube to provide signals which are applied to a color image reproducer.

Although such systems have received widespread acceptance in some areas, general TV studio use is one area wherein such systems have been found somewhat lacking in operational achievement. More specifically, the above-mentioned flying spot scanner system is suitable for providing a color image display from photographic film but includes no provision whatever for providing a color image display derived from color television signals as would be required in a consumer product.

Also, the above-mentioned flying spot scanner system requires some form of apparatus for immobilizing a photographic film insofar as a viewer is concerned. In other words, continuously moving or shifting film frames, such as a movie film, must appear as a single viewed slide in order to prevent undesired movement and blurring of the color image display.

One known form of immobilization apparatus employed with flying spot scanner systems is a continuous motion type of projector. Therein, a moving prism or lens system operates in conjunction with a continuous motion of the photographic film to provide a gradual disappearance of one scene and replacement thereof by another scene in a so-called lap-dissolve system.

Although such systems for film immobilization have been employed in so-called "commercial" type apparatus, it has been found that such systems are relatively expensive and employ different optical paths to derive successive frame images. This employment of differing optical paths has, therefore, been found prohibitive to a "consumer" type product because of excessive cost and the degree of perfection required of the optical apparatus.

Another known system for providing a color image display derived from photographic film is the so-called intermittent pulldown system. Herein, each one of a plurality of photographic film frames is scanned by a light beam while in the same physical location. These film frames scanned by the light beam in association with photomultiplier and cooperative processing stages provide color signals which are applied to a color image reproducer. This color image reproducer has an electron beam trace period during which a color image display observable by a viewer is provided and an electron beam retrace period during which time the color image reproducer is blanked providing no image display observable by a viewer.

In order to effect immobilization of a photographic film in such an intermittent pulldown type system, it has been found that vertical movement of the film must be effected in a manner such that the scan or trace period of the electron beam of a color image reproducer is substantially unaffected insofar as a viewer is concerned. In other words, vertical movement of the photographic film must be hidden from a viewer of the color image reproducer and any one of a number of techniques may be employed. Moreover, such techniques as vertical overscanning of the color image reproducer, correcting the vertical trace period potentials, and increased film pulldown speed are applicable and appropriate systems.

OBJECTS AND SUMMARY OF THE INVENTION

An object of the present invention is to provide an enhanced color image display system. Another object of the invention is to provide an improved system for displaying images derived from photographic films and from color television signals. Still another object of the present invention is to synchronize the conveyance of a photographic film through a flying spot scanner system and the electron beam scanning of a color image reproducer.

These and other objects are achieved in one aspect of the invention by a color image display system which includes a first source of signals responsive to color television signals, a second source of signals responsive to light-scanned photographic film, a color image reproducer, switching means for selectively applying signals to the color image reproducer from the first and second signal sources, and transport means for effecting conveyance of the photographic film through the second source of signals and synchronization of the film movement with electron beam scanning of a color image reproducer.

DESCRIPTION OF THE PREFERRED EMBODIMENTS

The present invention, together with other and further objects, advantages and capabilities thereof, will be best understood when considered in conjunction with the following disclosure, appended claims, and accompanying drawings.

Figure 1:
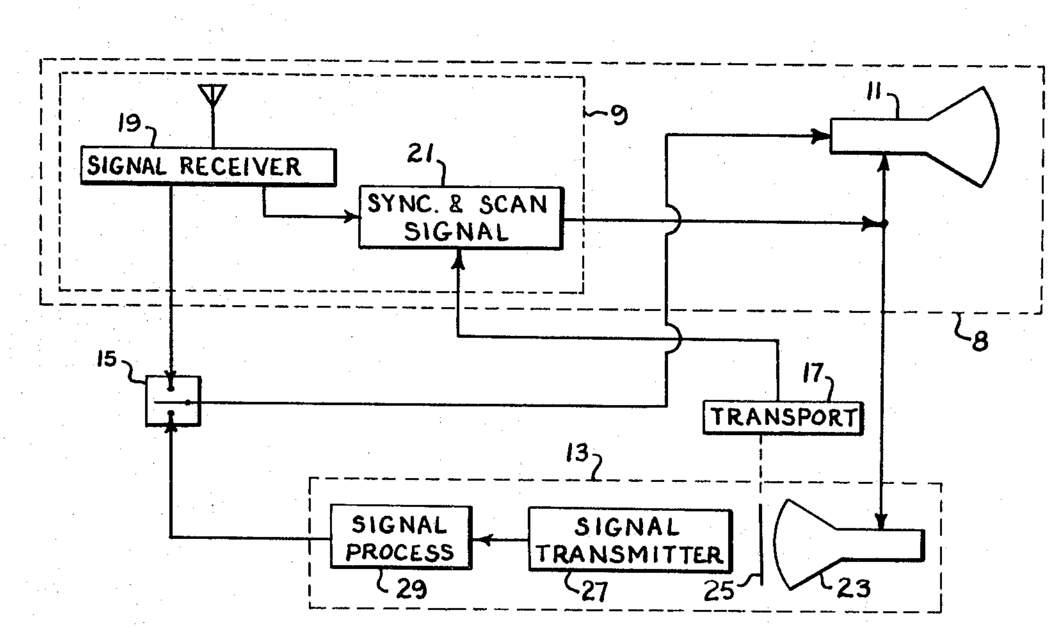
FIG. 1 is a diagrammatic illustration, in block form, of one embodiment of a color image display system.

Referring to the drawings, FIG. 1 illustrates a color image display system including a color television receiver 8 having a first source of signals 9 and a color image reproducer 11 and a second source of signals 13 in the form of a flying spot scanner system. The first and second signal sources 9 and 13 are connected to a switching means 15 for selective coupling of signals therefrom to the color image reproducer 11. Also, the first and second signal sources 9 and 13 are intercoupled by a transport means 17 for effecting conveyance of a photographic film through the second signal source 13 and synchronization of the first and second signal sources 9 and 13.

The first signal source 9 includes a signal receiver stage 19 and a synchronizing and scanning stage 21 coupled thereto. The second signal source 13 embodies a flying spot scanner tube 23, a film holder 25 substantially adjacent thereto, a signal transmitter stage 27 closely associated with the film holder 25, and a signal processing stage 29 coupled to the signal transmitter stage 27.

As to the provision of a color image display derived from both color television signals and photographic films, the signal receiver stage 19 of the first signal source 9 derives signals representative of luminance and chrominance information from intercepted color television signals and applies these derived signals to the switching means 15. The second signal source 13 in cooperation with the film transport means 17 derives signal representative of luminance and chrominance information from the photographic film and applies these derived signals to the switching means 15. In turn, the switching means 15 selectively couples these applied signals representative of luminance and chrominance information to the color image reproducer 11 of the color television receiver 8 to provide a visual image display.

Also, the synchronizing and scanning stage 21 of the first signal source 9 responds to the signal receiver stage 19 to cause development of synchronizing and scanning signals in response to color television signals. The transport means 17 effects conveyance of a photographic film through the second source of signals 13 and development of synchronizing and scanning signals which are selectively applied to the synchronizing and scanning stage 21. These selected synchronizing and scanning signals of the synchronizing and scanning stage 21 are, in turn, applied to the color image reproducer 11 and to the flying spot scanner tube 23 to effect electron beam deflection and scanning thereof.

In operation, a color television signal intercepted by the first source of signals 9 provides luminance and chrominance information which is applied via a switching means 15 to the color image reproducer 11. Also, synchronizing and scanning signals derived from the intercepted color television signals are applied via the synchronizing and scanning signal stage 21 to the color image reproducer 11 to effect a color image display.

Alternatively, a color image display derived from photographic film is effected by activation of the transport means 17 and the second source of signals 13. The transport means effects conveyance of a film through the second source of signals 13 to provide signals representative of luminance and chrominance information which are selectively applied to the color image reproducer 11 via the switching means 15. Also, the transport means 17 causes development and application of signals to the synchronizing and scanning stage 21 of the first signal source 9 which, in turn, effects synchronization of electron beam scanning of the color image reproducer 11 and flying spot scanner tube 23 with respect to film conveyance through the second source of signals 13.

Thus, the first source of signals 9, the color image reproducer 11, and the switching means 15 are employed to effect a color image display derived from color television signals. Moreover, the first and second source of signals 9 and 13, the switching means 15, the transport means 17 and the color image reproducer 11 are employed to effect a color image display derived from photographic film.

Further, the switching means 15 causes selective application to the color image reproducer 11 of signals representative of luminance and chrominance information available from the first and second signal sources 9 and 13. Also, the synchronizing and scanning stage 21 of the first signal source 9 selectively responds to synchronizing information derived from color television signals and from the transport means 17 to effect synchronization of electron beam scanning of the color image reproducer 11 and flying spot scanner tube 23 and conveyance of a film through the second source of signals 13.

Figure 2:
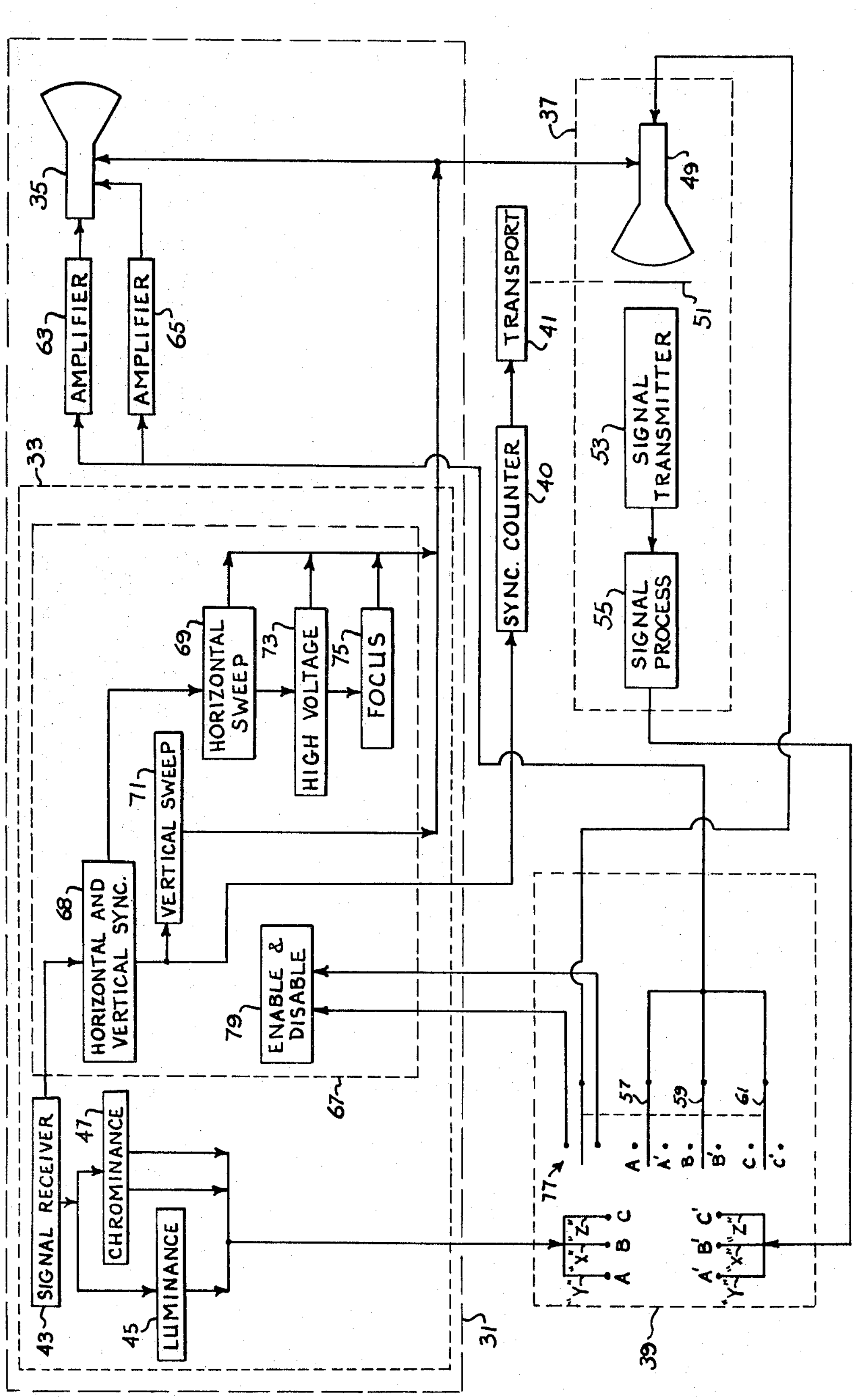
FIG. 2 is a block diagram of a preferred form of color image display system.

As a specific illustration of one preferred form of color image display system, reference is made to the diagrammatic illustration of FIG. 2. This color image display system includes a color television receiver 31 having a first source of signals 33 and a color image reproducer 35 and a second source of signals 37. A switching means 39 and a sync counter stage 40 and transport means 41 serve to selectively interconnect the first and second signal sources 33 and 37.

The first source of signals 33 of the color television receiver 31 includes a signal receiver stage 43 having the usual RF and IF application and detection stages commonly employed in the ordinary color television receiver. In the normal manner, a luminance channel 45 and a chrominance channel 47 are coupled to the signal receiver stage 43 to effect development of signals representative of luminance information or "Y" signals and signals representative of chrominance information or "X and Z" signals. These signals, "Y, X and Z," are applied to a plurality of contacts A, B and C of the switching means 39.

The second source of signals 37 includes a flying spot scanner tube 49 which provides a scanning light beam. This light beam is directed onto a photographic film disposed within the film holder 51 to provide signals in the signal transmitter and process stages 53 and 55 representative of luminance or "Y" and chrominance "X and Z" information which, in turn, are applied to a plurality of contacts A′, B′ and C′ of the switching means 39.

In addition to the contacts A, B, C and A′, B′, C′, the switching means 39 includes a plurality of ganged and positionally alterable arms 57, 59 and 61 respectively. Each of these alterable arms is associated with one of the contact pairs A–A′; B–B′; and C–C′. Also, each one of the alterable arms 57, 59 and 61 is coupled by way of one of a pair of amplifier stages 63 and 65 to the color image reproducer 35.

Thus, signals representative of luminance and chrominance information derived from color television signals are available at the contacts, A, B, and C. Signals representative of luminance and chrominance information derived from photographic film are available at the contacts A′, B′ and C′. Moreover, these signals are derived from the first and second signal sources 33 and 37 and applied to the contacts A, B, and C and A′, B′ and C′. Then, the switching means 39 selectively applies the signals to the color image reproducer 35 to provide a color image display derived from color television signals or photographic film.

As to the synchronization, the first source of signals 33 includes the signal receiver stage 43 wherein signals derived from intercepted color television signals are applied to a synchronizing and scanning system 67. This synchronizing and scanning system 67 includes a horizontal and vertical synchronizing stage 68 wherefrom synchronizing signals at a horizontal deflection frequency are applied to a horizontal sweep stage 69 and synchronizing signals at a vertical deflection frequency are applied to a vertical sweep stage 71.

The horizontal sweep stage 69 is coupled to a high-voltage stage 73 which is, in turn, coupled to a focus voltage stage 75. All of the stages, the horizontal sweep stage 69, the high-voltage stage 73, and the focus voltage stage 75 are coupled to the color image reproducer 35 of the color television receiver 31 and to the flying spot scanner tube 49 of the second signal source 37.

The vertical sweep stage 71 receives synchronizing signals at a vertical deflection frequency from the horizontal and vertical synchronizing stage 68 and develops vertical sweep signals which are applied to the parallel connected color image reproducer 35 and flying spot scanner tube 49. Also, signals at the vertical deflection frequency are applied to and control the operation of the synchronizing counter stage 40 which, in turn, controls the operation of the transport means 41 and the conveyance of a film through the second signal source 37.

Additionally, a second switching means 77 ganged to the switching means 39 operates in conjunction with an enablement and disablement stage 79 of the first source of signals 33 to effect selective enablement and disablement of the flying spot scanner tube 49 of the second source of signals 37. In other words, the flying spot scanner tube 49 is selectively disabled during operation of the first source of signals 33 and enabled during operation of the second source of signals 37.

Figure 3:
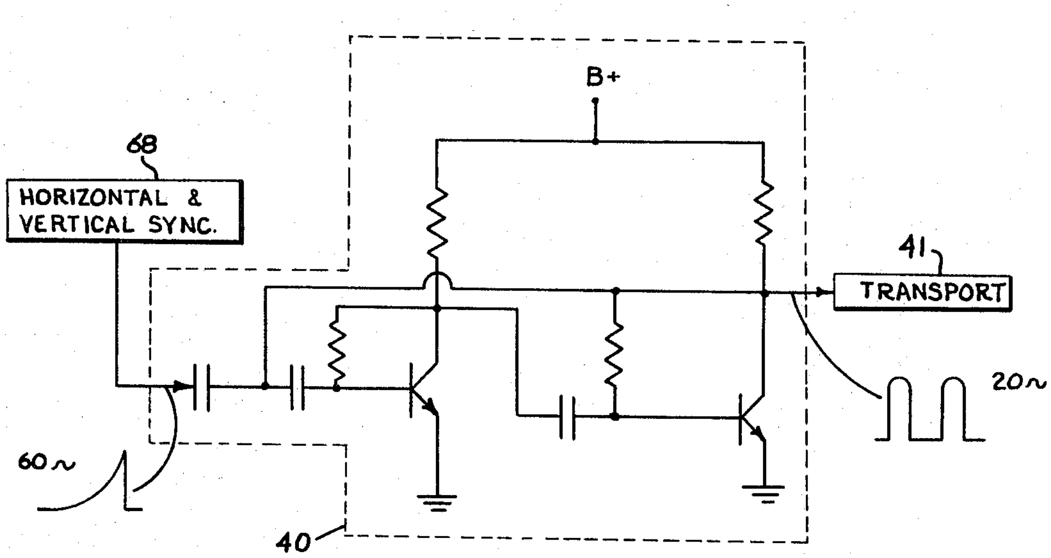
FIG. 3 is a schematic illustration of a preferred form of synchronizing counter stage suitable to the apparatus of FIG. 2.

As to specific apparatus suitable to the above-described preferred form of color image display system, FIG. 3 illustrates a preferred form of sync counter stage 40. Therein, synchronizing signals at a vertical deflection frequency, 60-cycles per second, available from the horizontal and vertical synchronizing stage 68 are applied to a sync counter stage 40.

At this point it should perhaps be noted that known consumer type apparatus for conveying film has a film movement or pulldown time in the range of about 5.5 to 7.0 milliseconds with a practical modified limit of about 3.5 milliseconds while the vertical retrace period of a normal color television receiver lasts about 1.5 milliseconds. Thus, it can be seen that the vertical retrace period of a color television receiver is insufficient to hide the movement of a photographic film by known film conveying apparatus. Accordingly, the viewer of a color image display would normally be subjected to undesired and annoying film movement when viewing a color image display derived from photographic film on a color image reproducer.

Referring back to the sync counter stage 40, this stage is preferably in the form of a multivibrator circuit wherefrom activating signals, at a frequency of about 20-cycles per second in this instance, are derived from vertical synchronizing signals of the horizontal and vertical synchronizing stage 68, and applied to the transport means 41. Obviously, activating signals at other and varying frequencies are readily available depending upon the employment of any one of a number of counter-type circuits.

In accordance with the activating signals applied thereto, the transport means 41, which is preferably in the form of electromechanical apparatus in intermittent coupling arrangement with a photographic film, serves to effect conveyance of the film through the second source of signals 37. Preferably, the transport means 41 effects intermittent movement of a film at about one-third the rate of vertical scanning of the flying spot scanner tube 49 and the color image reproducer 35.

However, it has been found that employment of relatively fast acting electromechanical apparatus in the transport means 41 will effect intermittent vertical movement of the film during the period of electron beam retrace which virtually eliminates observation of the film movement by a viewer. Moreover, effecting conveyance of the film during the retrace period permits employment of the vertical scan signals normally derived from the transmitted color television signals.

Figures 4, 5:
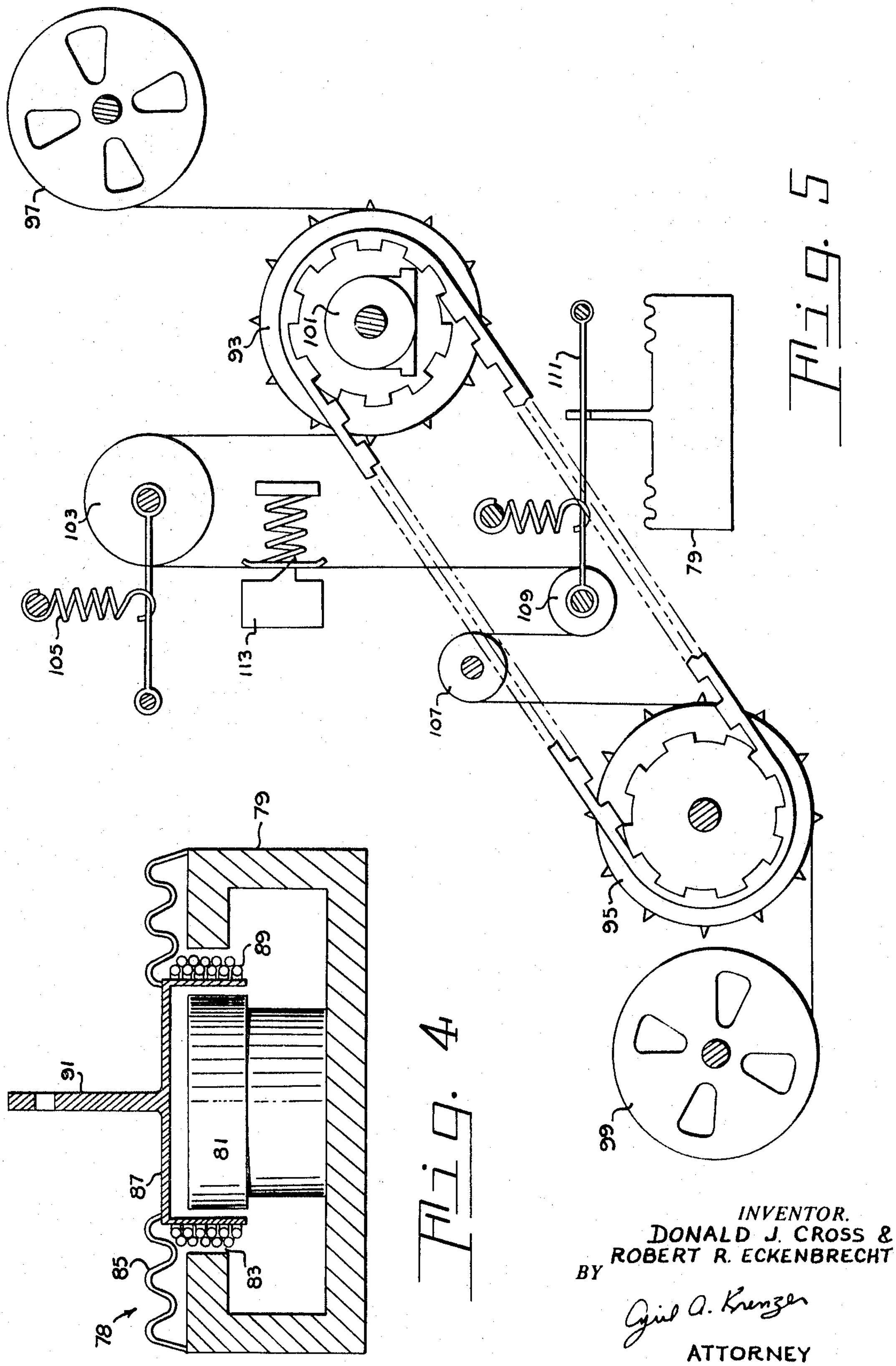
FIG. 4 illustrates a preferred form of film movement mechanism.
FIG. 5 illustrates a preferred film movement system employing the mechanism of FIG. 4.

For a preferred form of electromechanical apparatus suitable for use in the above-mentioned transport means, reference is made to illustrations of FIGS. 4 and 5. In the cross-sectional view of FIG. 4, the electromechanical apparatus 78 includes permanent magnet in the form of a cup-shaped yoke with inturned ends 79 forming an outer pole piece. An inner pole piece 81 is centrally attached to yoke 79 and disposed with respect to the in-turned ends thereof to form an airgap 83.

A corrugated suspension ring 85 is affixed to the yoke 79 and supports a coil form 87 whereon a coil 89 is disposed. This coil 89 is centrally suspended by the coil form 87 within the airgap of the outer and inner pole pieces 79 and 81 and a pulldown mechanism 91 is affixed to the coil form 87.

In operation, electrical signals applied to the coil 89 cause axial movement thereof within the magnetic field of the outer and inner pole pieces 79 and 81. In turn, axial movement of the pulldown mechanism or pawl 91 is achieved. Moreover, this apparatus has a maximum starting torque due to the location and movement of the coil 89 within the outer and inner pole pieces 79 and 81 while the normal solenoid, wherein the armature moves and the coil remains stationary, has a relatively large initial airgap and a relatively low starting torque.

In the diagrammatic operational system of FIG. 5, a pair of rachet drive wheels 93 and 95 are disposed intermediate a pair of film reels 97 and 99. These drive wheels 93 and 95 are mechanically coupled to one another and driven by a step motor 101 for effecting advance of a single frame of film.

A snubber post 103 is disposed adjacent the drive wheel 93 and has a spring member 105 affixed thereto for exerting a tensional force upon the film. An idler wheel 107 is supported adjacent the other drive wheel 95. Also, a pulldown cam member 109 is disposed adjacent the idler wheel 107 and affixed to the electromechanical apparatus 78 by a spring-loaded arm member 111. Moreover, a film engagement pawl 113 is placed intermediate the pulldown cam member 109 and the snubber post 103 and in engagement relationship with a film.

In operation, the step motor 101 causes advancement of the rachet wheels 93 and 95 making available a single frame of film. The film is held in engagement with the film engagement pawl 113 by means of the snubber post 103 and spring member 105.

Upon activation of the electromechanical apparatus 78, the pulldown cam member 109 exerts a force on and movement of the film intermediate thereto and the idler wheel 107 and intermediate thereto and the snubber cam 103. Also, the electromechanical apparatus 78 effects movement of the film in an amount of at least twice the amount of the movement of the pulldown cam member 109.

Thus, the electromechanical apparatus 78 includes a coil 89 disposed within the outer and inner pole pieces 79 and 81 and axially movable upon application of an electrical signal. The apparatus 78 causes movement of the coil 89 having a relatively low mass and a relatively large starting torque as compared with the armature of a solenoid. Moreover, the operational system effects film movement in an amount of about twice the movement of the electromechanical apparatus 78 and in a period of less than about 1.5 milliseconds.

In operation of the color image display system, a color image display derived from color television signals is provided by positionally locating the switching means 39 to effect connection with contacts A, B and C. Thereupon, luminance and chrominance information derived by the first source of signals 33 from intercepted color television signals is applied via the switching means 39 to the color image reproducer 35.

Also, horizontal and vertical sweep signals derived from color television signals by the synchronizing and scanning system 67 are applied to the color image reproducer 35. Moreover, the second switching means 77, ganged to the switching means 39, in conjunction with the enable and disable stage 79, serves to disable the flying spot scanner tube 49 of the second source of signals 37.

Alternatively, a color image display derived from photographic film may be affected by positionally altering the switching means 39 to effect connection thereof with the contacts A′, B′ and C′. The second switching means 77, ganged to the switching means 39, is also positionally altered to effect enablement of the flying spot scanner tube 49 of the second source of signals 37.

Also, the synchronizing and scanning system 67 derived horizontal and vertical sweep signals from an intercepted color television signal and applied these sweep signals to the color image reproducer 35 of the color television receiver 31 and to the flying spot scanner tube 49 of the second source of signals 37. Moreover, vertical synchronizing signals available from the synchronizing and scanning system 67 are applied to the sync counter stage 40. In turn, the sync counter stage 40 effects operation of the transport means 41 causing conveyance of a photographic film through the second source of signals 37.

Thus, positional location of the switching means 37 by a viewer causes enablement of the second source of signals 37 and conveyance of a photographic film therethrough by the transport means 41. Thereupon, luminance and chrominance information derived from the photographic film is applied via the switching means 39 to the color image reproducer 35 to effect a color image display. Moreover, this color image display is provided without observable vertical movement of the photographic film by an observer.

Thus, there has been provided a unique system for display color images derived from photographic films and from color television signals. The system provides synchronized vertical scanning of a color image reproducer and movement of a photographic film through a signal source in a manner such that a viewer of the color image reproducer is not disturbed or annoyed by undesired and observable film movement. Moreover, the system is uniquely adapted to a "consumer" type product which is relatively economical and uncomplicated when compared with known "commercial" type products.

While there have been shown and described what are at present considered the preferred embodiments of the invention, it will be understood that various changes and modifications may be made therein without departing from the invention as defined by the appended claims.

We claim:

1. A color image display system comprising in combination:

a color television receiver including a first signal source means providing signals representative of luminance, chrominance, synchronizing, and deflection information and a color image reproducer means coupled to said source of signals representative of synchronizing and deflection information, said first signal source means and said color image reproducer means effecting a period of electron beam scanning and a period of electron beam blanking of said reproducer means;

second signal source means responsive to light-scanned photographic film to provide signals representative of luminance and chrominance information;

transport means for effecting intermittent conveyance of a photographic film through said second signal source means, said transport means being in the form of electromechanical apparatus having a coil affixed to a pulldown mechanism and disposed intermediate outer and inner pole pieces and axially movable with respect to the pole pieces to effect vertical movement of said film within a time period nor greater than said period of electron beam blanking of said reproducer means;

counter means coupling said first signal source means to said transport means to effect synchronization of said photographic film conveyance through said second signal source means and electron beam deflection of said color image reproducer means and light-scanning of said photographic film; and switching means for selectively coupling said first and second signal source means to said color image reproducer for effecting a color image display on said color image reproducer.

2. The combination of claim 1 wherein said counter means receives synchronizing signals at a vertical deflection frequency and applies signals to said transport means at a frequency other than said vertical deflection frequency.

3. The combination of claim 1 wherein signals at a vertical deflection frequency are applied to said counter means and signals at submultiple of said vertical deflection frequency are applied to said transport means from said counter means.

4. The combination of claim 1 wherein said electromechanical apparatus effects movement of a film in an amount of at least twice the amount of movement of said pulldown mechanism.

* * * * *